United States Patent
Chen et al.

(10) Patent No.: US 9,438,095 B2
(45) Date of Patent: Sep. 6, 2016

(54) TRANSMISSION DEVICE

(71) Applicant: HON HAI PRECISION INDUSTRY CO., LTD., New Taipei (TW)

(72) Inventors: Mi-Chien Chen, New Taipei (TW); Ya-Yi Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 14 days.

(21) Appl. No.: 14/525,386

(22) Filed: Oct. 28, 2014

(65) Prior Publication Data

US 2015/0128761 A1     May 14, 2015

(30) Foreign Application Priority Data

Nov. 8, 2013   (TW) .............................. 102140799 A

(51) Int. Cl.
| | |
|---|---|
| *F16D 27/00* | (2006.01) |
| *H02K 49/10* | (2006.01) |
| *H02K 7/116* | (2006.01) |
| *H02K 16/00* | (2006.01) |

(52) U.S. Cl.
CPC ............ *H02K 49/106* (2013.01); *H02K 7/116* (2013.01); *H02K 16/00* (2013.01); *Y10T 74/19* (2015.01)

(58) Field of Classification Search
CPC ...................... F16D 27/00; F16D 2500/10475
USPC ................................... 74/640; 192/21.5, 84.1
See application file for complete search history.

(56) References Cited

U.S. PATENT DOCUMENTS

| | | | | |
|---|---|---|---|---|
| 3,358,798 A * | 12/1967 | Janson | .................... | F16D 37/02 192/21.5 |
| 3,680,671 A * | 8/1972 | Hendershot | ............. | F16D 37/02 192/21.5 |
| 6,619,453 B2 * | 9/2003 | Stretch | .................. | F16D 27/112 192/21.5 |
| 7,001,063 B1 * | 2/2006 | Markle | ................ | H02K 49/106 273/331 |
| 7,223,199 B2 * | 5/2007 | Willmot | ................... | B60K 6/36 475/269 |
| 8,177,528 B2 * | 5/2012 | Petersen | ............... | F04C 11/001 417/410.1 |

* cited by examiner

*Primary Examiner* — Ha D Ho
(74) *Attorney, Agent, or Firm* — Zhigang Ma

(57) ABSTRACT

A transmission device includes an input shaft, a first transmission mechanism, a speed changing mechanism, and an output shaft. The first transmission mechanism includes a transmission shaft, an inner magnetic member received in the transmission shaft, a mounting housing coupled to the input shaft, and an outer magnetic member. The input shaft is configured to rotate the mounting housing. The outer magnetic member is received in the mounting housing and positioned adjacent to the inner magnetic member. A magnetic pole of the inner magnetic member is opposite to a magnetic pole of the outer magnetic member. The speed changing mechanism is coupled to the transmission shaft. The output shaft is coupled to the speed changing mechanism.

20 Claims, 2 Drawing Sheets

TRANSMISSION DEVICE

FIELD

The subject matter herein generally relates to transmission devices, and particularly to a transmission device configured to increase speed or decrease speed.

BACKGROUND

A transmission device can be used in an automatic system or a robot for delivering a movement. The transmission device can include a harmonic generator or gears to transmit the movement.

BRIEF DESCRIPTION OF THE DRAWINGS

Implementations of the present technology will now be described, by way of example only, with reference to the attached figures.

DETAILED DESCRIPTION

Figure 1:
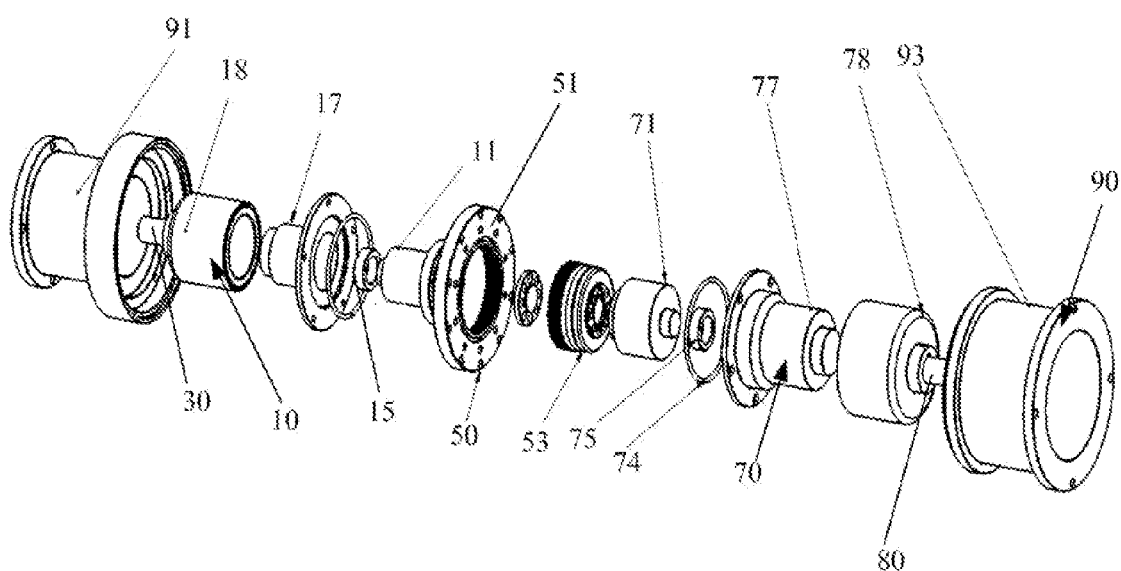
FIG. 1 is an exploded, isometric view of an embodiment of a transmission device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a transmission device which can include an input shaft, a first transmission mechanism coupled to the input shaft, a speed changing mechanism, and an output shaft. The first transmission mechanism can include a transmission shaft, an inner magnetic member received in the transmission shaft, a cover covering the transmission shaft, a mounting housing movably covering the cover and coupled to the input shaft, and an outer magnetic member. The input shaft can be configured to rotate the mounting housing. The outer magnetic member can be received in the mounting housing and positioned adjacent to the inner magnetic member. A magnetic pole of the inner magnetic member can be opposite to a magnetic pole of the outer magnetic member. The speed changing mechanism can be coupled to the cover and positioned at a side of the cover away from the input shaft. The output shaft can be coupled to the speed changing mechanism.

The present disclosure is further in relation to a transmission device which can include an input shaft, a first transmission mechanism, a speed changing mechanism, and an output shaft. The first transmission mechanism can include a transmission shaft, an inner magnetic member received in the transmission shaft, a mounting housing coupled to the input shaft, and an outer magnetic member. The input shaft can be configured to rotate the mounting housing. The outer magnetic member can be received in the mounting housing and positioned adjacent to the inner magnetic member. A magnetic pole of the inner magnetic member can be opposite to a magnetic pole of the outer magnetic member. The speed changing mechanism can be coupled to the transmission shaft. The output shaft can be coupled to the speed changing mechanism.

Figure 2:
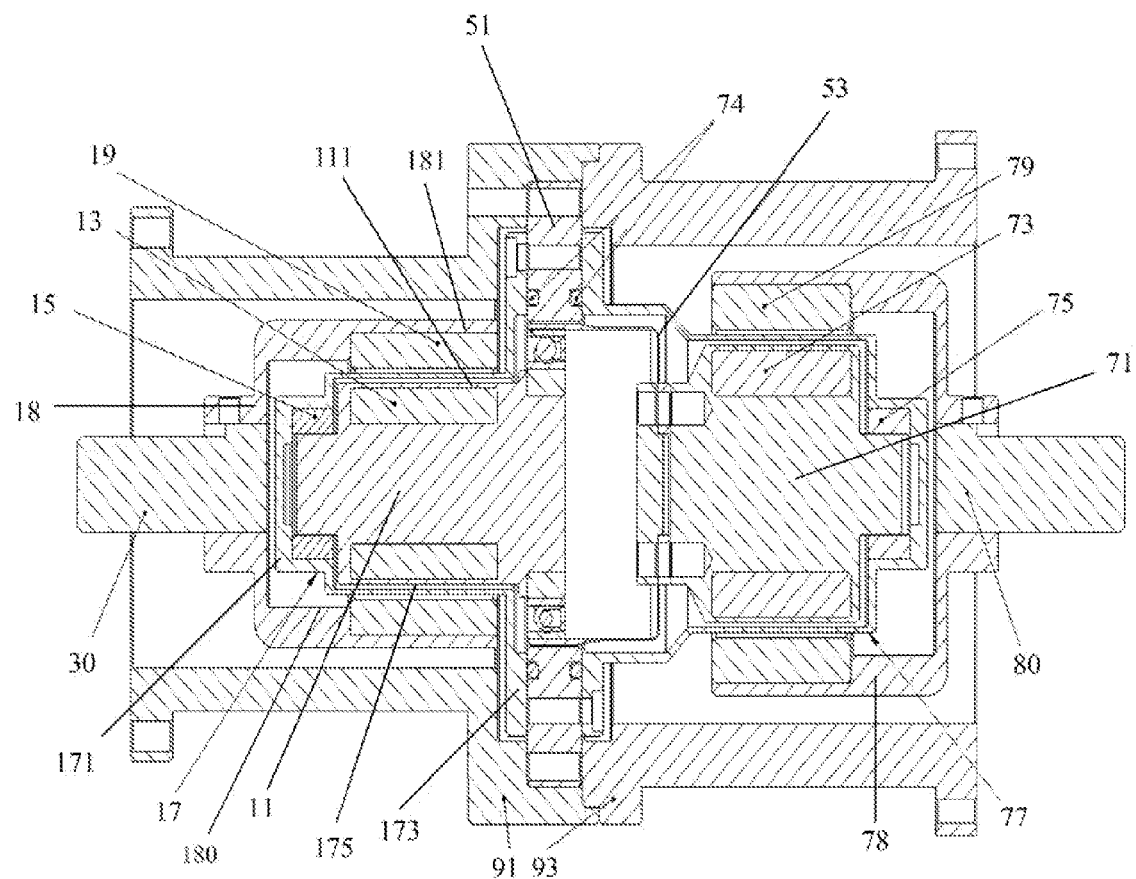
FIG. 2 is a cross sectional view of the transmission device of FIG. 1.

FIGS. 1 and 2 illustrate an embodiment of a transmission device 100. The transmission device 100 can include a first transmission mechanism 10, an input shaft 30, a speed changing mechanism 50, a second transmission mechanism 70, an output shaft 80, and a protective housing 90. The first transmission mechanism 10 can be coupled to the input shaft 30. The second transmission mechanism 70 can be coupled to the output shaft 80. The speed changing mechanism 50 can be positioned between the first transmission mechanism 10 and the second transmission mechanism 70. The protective housing 90 can be sleeved on the first transmission mechanism 10, the speed changing mechanism 50, and the second transmission mechanism 70 for protecting mechanisms therein. The protective housing 90 can be further configured to be coupled with an outer base or an outer driver.

The first transmission mechanism 10 can include a transmission shaft 11, an inner magnetic member 13 received in the transmission shaft 11, a bush 15 sleeved on the transmission shaft 11, a cover 17 sleeved on the transmission shaft 11 and the bush 15, a mounting housing 18 movably covering the cover 17, and an outer magnetic member 19 received in the mounting housing 18.

The first transmission shaft 11 can define a receiving chamber 111 adjacent to an outer sidewall thereof. The inner magnetic member 13 can be received in the receiving chamber 111 of the transmission shaft 11 and abut against the transmission shaft 11. The inner magnetic member 13 can be seamless with the transmission shaft 11. The inner magnetic member 13 can be positioned at a circumference of the transmission shaft 11 and surround a center axis of the transmission shaft 11. The bush 15 can be sleeved at an end portion of the transmission shaft 11 away from the speed changing mechanism 50. In the illustrated embodiment, the inner magnetic member 13 is a hollow cylindrical magnet. In at least one embodiment, the inner magnetic member 13 can include a plurality of bar-shaped magnets positioned around an axis of the transmission shaft 11 and a number of the receiving chamber 111 can be equal to a number of the magnets. In the illustrated embodiment, the receiving chamber 111 can be a closed chamber. In at least one embodiment, the receiving chamber 111 can pass through an outer side surface of the transmission shaft 11.

The cover 17 can be a cover defining a chamber having an opening. The cover 17 can include a cover body 171 and a fixing flange 173 perpendicularly protruding from an edge of the cover body 171 outward. The fixing flange 173 can be adjacent to the opening of the cover 17. The cover body 171 can cover the bush 15 and the transmission shaft 11. The cover body 171 can be seamless with the bush 15. Thus, the cover body 171 can secure the bush 15 on the transmission shaft 11. A gap 175 can be defined between the cover body 171 and the transmission shaft 11. The fixing flange 173 can be sleeved on an end portion of the transmission shaft 11 away from the bush 15, and the end portion of the transmission shaft 11 can be exposed from the cover body 171 and the fixing flange 173.

The mounting housing 18 can be substantially hollow cylindrical and define an opening at each end portion thereof. The mounting housing 18 can cover the cover body 171 from the end portion of the cover body 171 away from the fixing flange 173. The mounting housing 18 can be rotatable relative to the cover 17 along a center axis of the cover 17. A receiving groove 181 can be defined at an inner wall 180 of the mounting housing 18 and corresponding to the receiving chamber 111. The outer magnetic member 19 can be received in the receiving groove 181 and seamless with the mounting housing 18. The outer magnetic member 19 can be positioned adjacent to the inner magnetic member 13. A magnetic pole of the inner magnetic member 13 can be opposite to a magnetic pole of the outer magnetic member 19. In the illustrated embodiment, the outer magnetic member 19 can be cylindrical. The outer magnetic member 19 can be coaxial with the inner magnetic member 13 and surround the inner magnetic member 13. In the least one embodiment, the outer magnetic member 19 can include a plurality of bar-shaped magnets positioned around the center axis of the cover 17 and a number of the receiving groove 181 can be equal to a number of the magnets.

A first end portion 31 of the input shaft 30 can be received in an end portion of the mounting housing 18 adjacent to the bush 15 and fixed to the mounting housing 18. The input shaft 30, the mounting housing 18, the cover 17, the inner magnetic member 13, and the outer magnetic member 19 both can be arranged along a same center axis.

The speed changing mechanism 50 can be positioned at a side of the cover 17 adjacent to the fixing flange 173 and fixed with the fixing flange 173. In the illustrated embodiment, the speed changing mechanism 50 can include a first transmission member 51 and a second transmission member 53 meshing the first transmission member 51. The first transmission member 51 can be substantially in a cylindrical shape and sleeved on the second transmission member 53. The first transmission member 51 can be fixed to the fixing flange 173 of the cover 17. The second transmission member 53 can be partly received in the first transmission member 51 and extend away from the input shaft 30. In the illustrated embodiment, the first transmission member 51 and the second transmission member 53 can be gears.

A structure of the second transmission mechanism 70 can be similar to a structure of the first transmission mechanism 10. The second transmission mechanism 70 and the first transmission mechanism 10 can be positioned at opposite sides of the speed changing mechanism 50. The second transmission mechanism 70 can also include a transmission shaft 71, an inner magnetic member 73 received in the transmission shaft 71, a bush 75 sleeved on the transmission shaft 71, a cover 77 sleeved on the transmission shaft 71 and the bush 75, a mounting housing 78 covering the cover 77, and an outer magnetic member 79 received in the mounting housing 78. For the sake of simplify the specification, the introduction of the second transmission mechanism 70 is simplified. The cover 77 of the second transmission mechanism 70 can be fixed to the first transmission member 51 of the speed changing mechanism 50. A sealing ring 74 can be positioned between the cover 77 and the first transmission member 51 and another sealing ring 74 can be positioned between the cover 71 and the first transmission member 51. The transmission shaft 71 can be coupled to the second transmission member 53. The cover 77 can cover the second transmission member 53.

The output shaft 80 can be received in the mounting housing 78 and can be coupled to the mounting housing 78. The output shaft 80, the mounting housing 78, the cover 77, the inner magnetic member 73, and the outer magnetic member 79, the input shaft 30, and the transmission shaft 71 both can be arranged along a same center axis.

The protective housing 90 can include a first housing 91 and a second housing 93. The first housing 91 and the second housing 93 both can be substantially hollow and cylindrical in shape. The first housing 91 can be sleeved on the first transmission mechanism 10 and the first transmission member 51 of the speed changing mechanism 50. The second housing 93 can be sleeved on the second transmission mechanism 70 and the second transmission member 53 of the speed changing mechanism 50. The second housing 93 can abut against the first housing 91. The first housing 91 and the second housing 93 can be configured to be coupled with an outer base or an outer driver.

When in use, the input shaft 30 can be rotated by an outer driver, and thus the input shaft 30 can rotate the mounting housing 18. Due to the magnetic pole of the outer magnetic member 19 being opposite to that of the inner magnetic member 13, when the outer magnetic member 19 rotates following a rotation of the mounting housing 18, the transmission shaft 11 and the cover 17 can rotate via a magnetic force. Then, the first transmission member 51 can rotate along a center axis thereof. The second transmission member 53 can be rotated and a transmission speed can be changed. The second transmission member 53 further rotates the transmission shaft 71. The transmission shaft 71 can rotate the output shaft 80 via the inner magnetic member 73, the outer magnetic member 71, and the mounting housing 78.

In at least one embodiment, the speed changing mechanism 50 can be unlimited in the illustrated structure. The protecting housing 90 and the second transmission mechanism 50 can be omitted.

The embodiments shown and described above are only examples. Many details are often found in the art such as the other features of a transmission device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A transmission device comprising:
an input shaft;
a first transmission mechanism coupled to the input shaft and comprising:
a transmission shaft,
an inner magnetic member received in the transmission shaft,
a cover covering the transmission shaft,
a mounting housing movably covering the cover and coupled to the input shaft, the input shaft configured to rotate the mounting housing, and
an outer magnetic member received in the mounting housing and positioned adjacent to the inner magnetic member, a magnetic pole of the inner magnetic member being opposite to a magnetic pole of the outer magnetic member;
a speed changing mechanism coupled to the cover and positioned at a side of the cover away from the input shaft; and
an output shaft coupled to the speed changing mechanism.

2. The transmission device of claim 1, wherein the inner magnetic member is positioned at a circumference of the transmission shaft and surrounds a center axis of the transmission shaft.

3. The transmission device of claim 1, wherein the transmission shaft is coaxial with the mounting housing.

4. The transmission device of claim 1, wherein the first transmission mechanism further comprises a bush sleeved on an end portion of the transmission shaft away from the speed changing mechanism, the cover covers the bush and coupled to the bush.

5. The transmission device of claim 1, wherein the cover comprises:
a cover body, and
a fixing flange perpendicularly protruding from an edge of the cover body outward and fixed to the speed changing mechanism.

6. The transmission device of claim 1, wherein the speed changing mechanism comprises a first transmission member and a second transmission member meshing the first transmission member, the first transmission member is coupled to the cover, the second transmission member is coupled to the output shaft.

7. The transmission device of claim 6, wherein the transmission device further comprises a second transmission mechanism, the speed changing mechanism is coupled to the output shaft via the second transmission mechanism.

8. The transmission device of claim 7, wherein the second transmission mechanism comprises:
a transmission shaft coupled to the second transmission member,
an inner magnetic member received in the transmission shaft of the second transmission mechanism,
a cover covering the transmission shaft of the second transmission mechanism,
a mounting housing movably covering the cover of the second transmission mechanism, and
an outer magnetic member received in the mounting housing of the second transmission mechanism.

9. The transmission device of claim 8, wherein a sealing ring is positioned between the cover of the second transmission mechanism and the first transmission member, another sealing ring is positioned between the cover of the first transmission mechanism and the first transmission member.

10. The transmission device of claim 7, wherein a protective housing comprises a first housing and a second housing, the first housing covers the first transmission mechanism and the speed changing mechanism, the second housing covers the second transmission mechanism and the speed changing mechanism, the second housing abuts against the first housing.

11. A transmission device comprising:
an input shaft;
a first transmission mechanism comprising:
a transmission shaft,
an inner magnetic member received in the transmission shaft,
a mounting housing coupled to the input shaft, the input shaft configured to rotate the mounting housing, and
an outer magnetic member received in the mounting housing and positioned adjacent to the inner magnetic member, a magnetic pole of the inner magnetic member being opposite to a magnetic pole of the outer magnetic member;
a speed changing mechanism coupled to the transmission shaft; and
an output shaft coupled to the speed changing mechanism.

12. The transmission device of claim 11, wherein the inner magnetic member is positioned at a circumference of the transmission shaft and surrounds a center axis of the transmission shaft, a receiving groove is defined at an inner wall of the mounting housing, the outer magnetic member is received in the receiving groove.

13. The transmission device of claim 11, wherein the first transmission mechanism further comprises a cover covering the transmission shaft and coupled to the transmission shaft.

14. The transmission device of claim 13, wherein the first transmission mechanism further comprises a bush sleeved on an end portion of the transmission shaft away from the speed changing mechanism, the cover is coupled to the transmission shaft via the bush.

15. The transmission device of claim 13, wherein the cover comprises:
a cover body, and
a fixing flange perpendicularly protruding from an edge of the cover body outward and coupled to the speed changing mechanism.

16. The transmission device of claim 15, wherein the speed changing mechanism comprises a first transmission member and a second transmission member meshing the first transmission member, the first transmission member is coupled to the cover body of the cover, the second transmission member is coupled to the output shaft.

17. The transmission device of claim 16, wherein the transmission device further comprises a second transmission mechanism, the speed changing mechanism is coupled to the output shaft via the second transmission mechanism.

18. The transmission device of claim 17, wherein the second transmission mechanism comprises:
a transmission shaft coupled to the second transmission member,
an inner magnetic member received in the transmission shaft of the second transmission mechanism,
a mounting housing coupled to the output shaft, and
an outer magnetic member received in the mounting housing of the second transmission mechanism.

19. The transmission device of claim 18, wherein the second transmission mechanism further comprises a cover covering the transmission shaft of the second transmission mechanism.

20. The transmission device of claim 17, wherein a protective housing comprises a first housing and a second housing, the first housing covers the first transmission mechanism and the speed changing mechanism, the second housing covers the second transmission mechanism and the speed changing mechanism, the second housing abuts against the first housing.

\* \* \* \* \*